(12) United States Patent
Lowry

(10) Patent No.: US 6,818,046 B1
(45) Date of Patent: Nov. 16, 2004

(54) LIQUID PURIFYING DEVICE

(76) Inventor: Charles Andrew Lowry, 770 E. Vine St., #B, Salt Lake City, UT (US) 84107

( * ) Notice: Subject to any disclaimer, the term of this patent is extended or adjusted under 35 U.S.C. 154(b) by 635 days.

(21) Appl. No.: 09/621,408

(22) Filed: Jul. 21, 2000

(51) Int. Cl.[7] ............................................. B01D 35/01
(52) U.S. Cl. ........................... 96/194; 96/219; 210/188; 210/443
(58) Field of Search ................................ 210/168, 180, 210/436, 472, DIG. 13, 188, 443; 96/219, 193, 194, 197, 198; 123/196 A; 196/46.1

(56) References Cited

U.S. PATENT DOCUMENTS

| | | |
|---|---|---|
| 1,718,800 A | 6/1929 | Rea |
| 2,472,717 A | 6/1949 | Morey |
| 2,839,196 A | 6/1958 | Schwalge |
| 3,756,412 A | 9/1973 | Barrow |
| 4,006,084 A | 2/1977 | Priest |
| 4,115,201 A | 9/1978 | Malec |
| 4,146,475 A | 3/1979 | Forsland |
| 4,189,351 A | 2/1980 | Engel |
| 4,289,583 A | 9/1981 | Engel |
| 4,349,438 A | 9/1982 | Sims |
| 4,354,946 A | 10/1982 | Warlick |
| 4,369,110 A | 1/1983 | Picek |
| 4,443,334 A | 4/1984 | Shugarman |
| 4,717,474 A | 1/1988 | Sims |
| 4,830,745 A | 5/1989 | van Der Meulen |
| 4,943,352 A | 7/1990 | Lefebvre et al. |
| 5,198,104 A | 3/1993 | Menyhert |
| 5,242,034 A | 9/1993 | De Paul |
| 5,322,596 A | 6/1994 | Arntz |
| 5,630,912 A | 5/1997 | LeFebvre |
| 5,630,956 A | 5/1997 | Lynch |
| 5,776,315 A | 7/1998 | Lowry |
| 5,824,211 A | 10/1998 | Lowry |
| 6,368,497 B1 * | 4/2002 | de Sylva ..................... 210/120 |

OTHER PUBLICATIONS 472 958 Document Disclosed by Inventor.

* cited by examiner

Primary Examiner—Matthew O. Savage

(57) ABSTRACT

A liquid purifying device for separation and removal of volatile contaminants from liquids. A first feature of this design is an improved utilization of space, thus affording simplified and convenient mounting means, usually in the place of a standard filter.

1 Claim, 20 Drawing Sheets

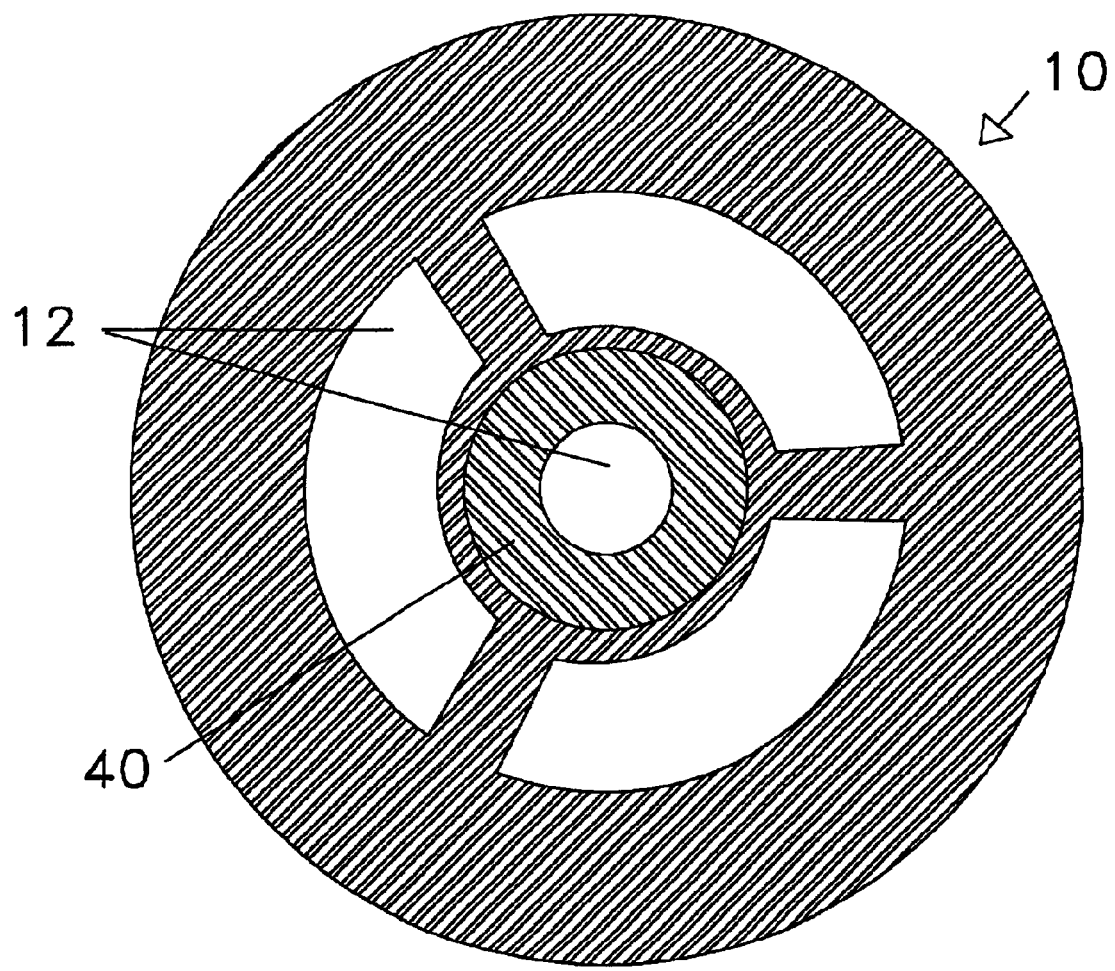

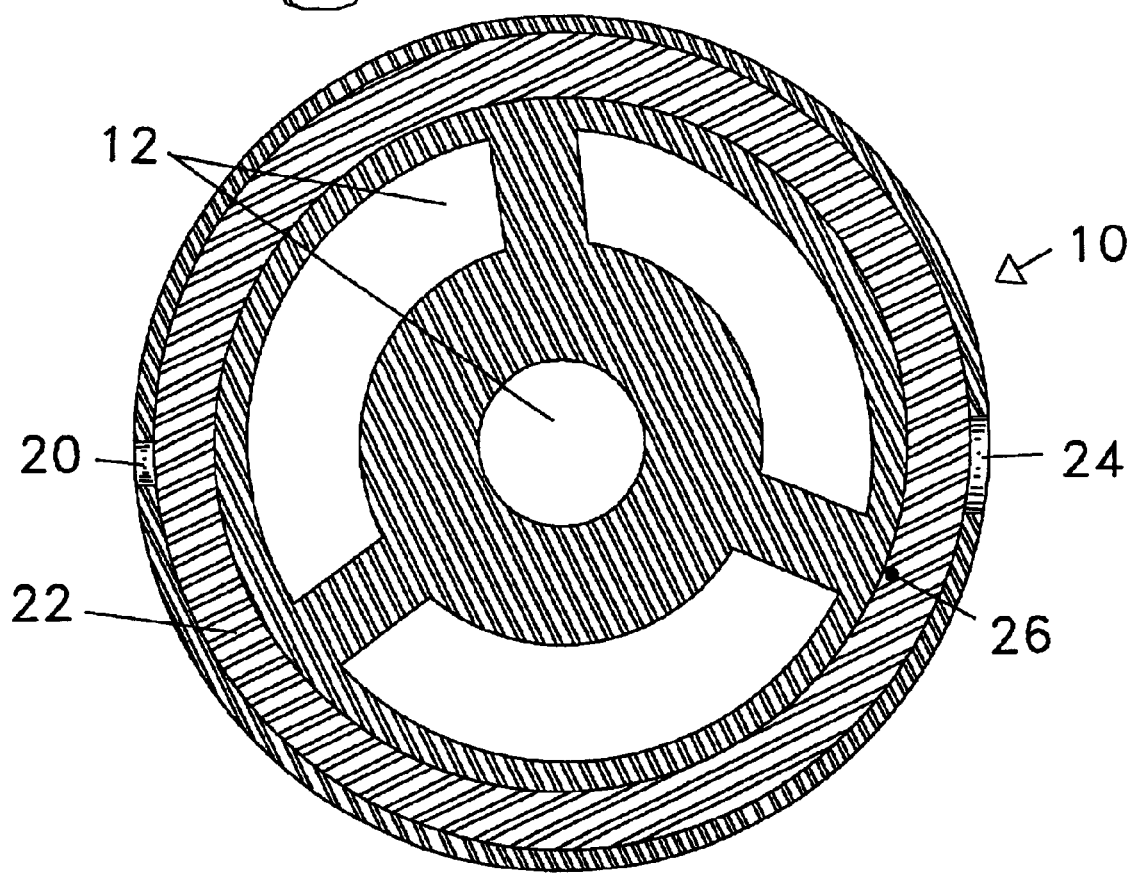

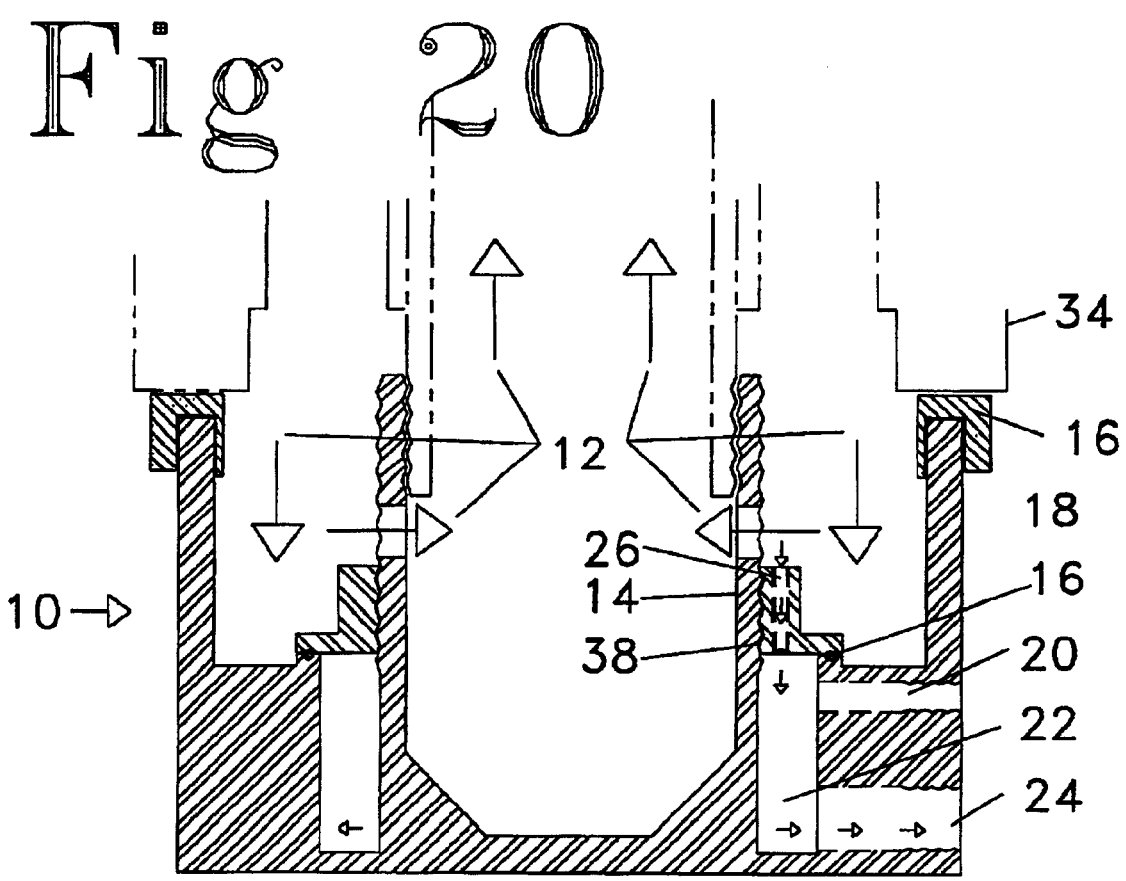

LIQUID PURIFYING DEVICE

BACKGROUND OF THE INVENTION

1. Field of the Invention

The present invention and Patent Office Disclosure 472958 relates to a device for purifying liquids, and particularly relates to such a liquid purifying device utilizing the process of distillation/evaporation of volatile contaminants contained within a liquid to separate and remove such volatile contaminants from the contaminated liquid, and more particularly relates to such a device that utilizes a distillation/evaporation chamber which is mounted in place of or complementing the standard factory liquid filtering system.

2. Description of the Prior Art

There presently exist a number of distillation-type liquid separation and reclamation devices for distillation/evaporation and removal of volatile contaminants from contaminated liquid. Most of these units are utilize what is called the thin-film evaporation process, wherein the oil is passed over a heated flat horizontal surface (evaporation plate), the theory being that the heat will cause the oil to flow to such a "thin film" on the flat horizontal surface that volatile contaminants having a boiling point lower than that of the temperature of the evaporation plate will be evaporated, followed by a collection of the "purified" oil following contaminant evaporation. In addition, most of these thin-film evaporation-type distillation units incorporate a separate heating element (generally electric) for maintaining the evaporation plate at the desired temperature. Typical of these units are shown in U.S. Pat. Nos. 1,718,800, 2,472,717, and 4,006,084.

One of the problems with these prior art thin-film is that an electric heating element in the general vicinity of volatile contaminants and engine fuel creates a potentially explosive environment. Another problem with prior art thin-film is that they are complicated and expensive to manufacture and service.

Additionally, most of these units require external mounting equipment and a convenient location for the placement of these devices. Oil distillation/evaporation units of this type are shown in U.S. Pat. Nos. 1,718,800, 2,472,717, 2,839,196, 3,198,104, 3,756,412, 4,006,084, 4,115,201, 4,189,351, 4,146,475, 4,289,583, 4,443,334, 4,349,438, 4,354,946, 4,369,110, 4,717,474, 4,830,745, 4,943,352, 5,242,034, 5,322,596; 5,630,912, 5,630,912, and applicants own U.S. Pat. Nos. 5,824,211 and 5,776,315. All these patents disclose liquid purifying device designs which are mounted remotely from the source of the liquid. None of the prior art utilizes an existing filtration system to effect a simple and effective liquid supply and mounting system for the liquid purifying device such as the system illustrated in this patent application.

There remains a need for an efficient evaporation apparatus that is small enough for use in a wide variety of applications while not being limited to the conventional means of liquid supply and liquid purifying device placement and mounting. However, at the time the present liquid purifying device was made, it was not obvious to those of ordinary skill in the art how those needs could be fulfilled, in view of the prior art as a whole.

OBJECT OF THE INVENTION

It is therefore an object of the present invention to provide a device for removing volatile contaminates from liquid that utilizes heat from the liquid to effect vaporization of the contaminants, rather than a separate heating element.

It is further object of the present invention to provide such a device that is small and compact, and conveniently fastens to existing liquid filter mounts.

SUMMARY OF THE INVENTION

The liquid purifying device (10) of the present invention is utilized for separating and removing volatile contaminants from liquids. In one embodiment, the device incorporates a self-contained particle filter (32) for filtering particles from the contaminated liquid. The liquid purifying device (10) itself comprises a distillation/evaporation chamber positioned essentially between the liquid source and the particle filter, and receives contaminated liquid that has been filtered by the filter media (20). The filtered contaminated liquid is passed through the liquid metering orifice (26), whereupon the oil enters the distillation/evaporation chamber (22). Upon entering the distillation/evaporation chamber (22) the metered liquid spreads in a thin film, thereby effecting the distillation/evaporation process.

Heat for distillation/evaporation of the volatile contaminants from the liquid acting directly within the distillation/evaporation chamber (22) is provided by the heated liquid itself, without the necessity of a separate heating element to maintain the vaporization temperature of the distillation/evaporation chamber.

This distillation/evaporation process is based on the well known principles of the thin-film evaporation process, wherein a liquid is spread into a thin film and heated, thus allowing trapped volatile elements such as water, gasoline, trapped gases, etcetera, within the liquid to be evaporated and vented outside the liquid purifying device.

This liquid purifying device is typically used in a full-flow filter capacity with an internal combustion engine, whereby a small amount of contaminated engine oil is tapped form the normal oil flow through the filter and processed through the liquid purifying device, whereupon the volatile contaminants are vaporized, separated, and removed from the oil. The processed lubricating oil is then returned to the engine oil pan through purified liquid exit (24). The liquid to be purified communicates to the filter through a plurality of liquid filter communicating conduits (12) such that certain conduits allow liquid to flow to the filter and certain other conduits allow liquid to return to the source with little or no impedance in overall liquid flow. This liquid purifying device effectively utilizes the existing liquid filter mounting system to facilitate its own mounting and provide a convenient source of liquid.

In other application, the particle filter may or may not be used. Rather, contaminated liquid-hydraulic liquid, machining oil, cooking oil, heating/cooling liquid, etc.—with or without pre-heating—may be pumped directly into the distillation/evaporation chamber for evaporation, distillation, and removal of volatile contaminants therefrom, the processed liquid then being returned to the mechanism in which it is used.

A first feature of this liquid purifying device is the improved utilization of space by the use of the existing liquid filter mounting system. This utilization brings the benefits of a compact installation with a direct liquid source and convenient placement with minimum difficulty of installation and maintenance. Another benefit of this design is the efficient use of the heat inherent to most liquid sources to heat the evaporation chamber evenly and effectively without the need of any additional heat source, which eliminates the need for potentially dangerous heating elements while improving efficiency and reducing manufacturing costs.

Thus it is understood that a primary object of this liquid purifying device is to advance the art of liquid purifying by providing a device with is easily and conveniently mounted, simple to maintained, safer and more reliable operation, and is useful in a much greater range of applications.

These and other important objects, features and advantages of this liquid purifying device will become apparent as this description proceeds.

This liquid purifying device accordingly comprises the features of construction, combination of elements and arrangement of parts that will be exemplified in the construction hereinafter set forth, and the scope of this liquid purifying device will be indicated in the claims.

BRIEF DESCRIPTION OF THE DRAWINGS

Other objects of this liquid purifying device will appear in the following description and appended claims, reference being made to FIGS. 1–20 forming a part of the specification wherein like reference characters designate corresponding parts.

FIG. 18 is a bottom plan view of a sixth embodiment of the liquid purifying device.

FIG. 19 is a horizontal sectional view of a sixth embodiment of the liquid purifying device, said view being taken along line 4—4 in FIG. 16.

FIG. 20 is a vertical sectional view of a seventh alternative design of the liquid purifying device.

LIST OF REFERENCE NUMERALS

10 Liquid purifying device.
12 Liquid filter communicating conduits.
14 Liquid refiner to liquid source attachment means.
16 Liquid seals.
18 Distillation/evaporation chamber lid.
20 Vapor vent.
22 Distillation/evaporation chamber.
24 Refined liquid exit.
26 Liquid metering orifice.
28 Liquid diverting obstruction.
32 Liquid filter.
34 Liquid source.
36 Liquid filter element.
38 Distillation/evaporation chamber lid attachment means.
40 Filter to liquid purifying device attachment means.

DESCRIPTION OF SPECIFIC EMBODIMENTS

The liquid purifying device of the present invention has application in many environments. For example, the device may be used to supplement factory filter systems in internal combustion engines in both mobile and stationary applications. It is also contemplated that the present liquid purifying device will have application in hydraulic systems, and in industrial applications wherever hydraulic liquid (oil), cutting (machining) oil, drilling liquid, cooking oil, cleaning liquids, cooling/heating liquids, etc. are used. For purposes of description and explanation of the concept of the liquid purifying device, however, and without limiting the concept or application of the invention, the liquid purifying device will be described in an application of an oil-lubricated internal combustion engine.

Figure 1:
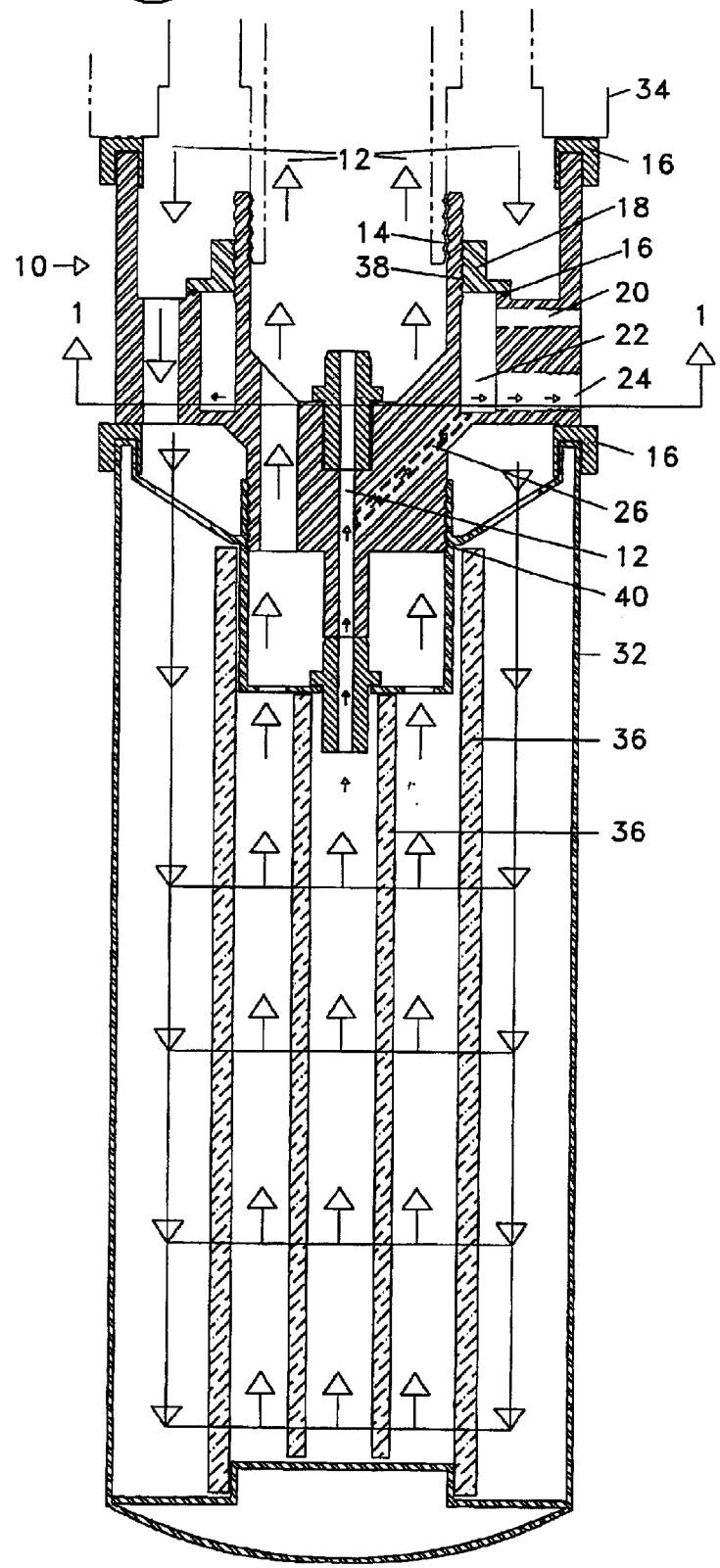
FIG. 1 is a vertical sectional view of the liquid purifying device of the present invention including the particulate filter.
Figure 2:
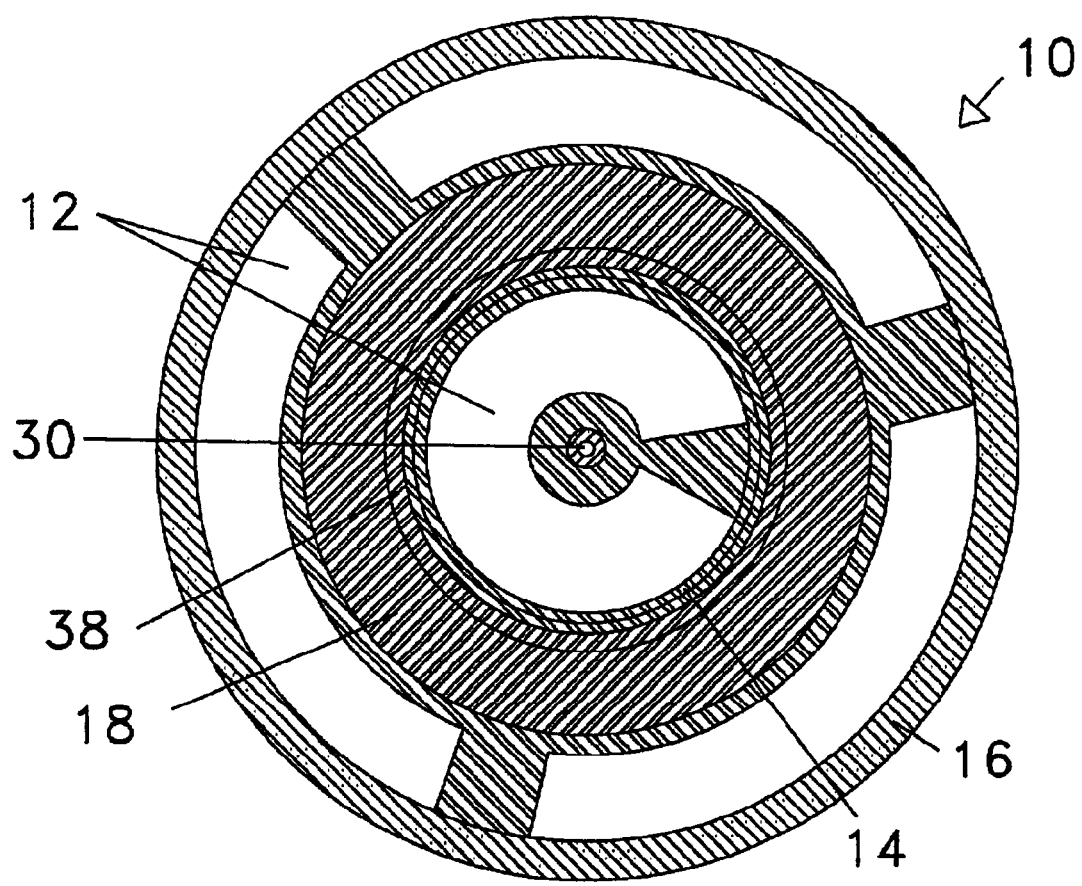
FIG. 2 is a top plan view of a first embodiment of the liquid purifying device.
Figure 3:
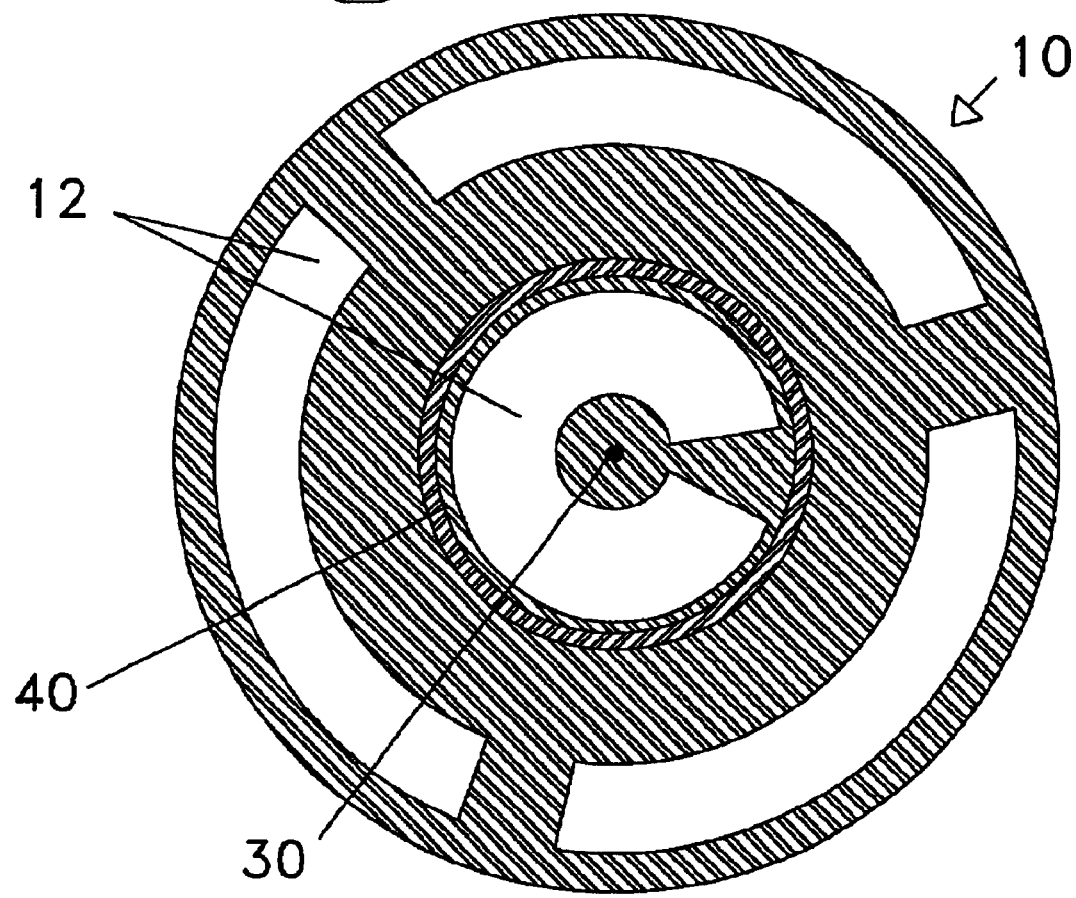
FIG. 3 is a bottom plan view of a first embodiment of the liquid purifying device.

Turning now to the drawings, and initially to FIG. 1, the liquid purifying device is shown generally illustrated by the numeral 10. The device includes a combination liquid purifying device to liquid source attachment means (14), filter to liquid purifying device attachment means (40), liquid communication conduits (12), and liquid filter (32). Oil from the engine flows through the liquid purifying device through the liquid communication conduits(s) (12) unimpeded to the liquid filter (32), which oil passes through the liquid filter (32) in the customary manner and returns to the engine through additional liquid communication conduit(s) (12) allowing the liquid purifying device to be mounted in-between the engine and the conventional oil filter while retaining the function of the conventional filter with the added capabilities of volatile contaminate removal.

The liquid refining device 10 includes a contaminated oil metering orifice (26) for conducting oil under pressure from the engine oil pump (not shown) to the distillation/evaporation chamber while simultaneously moderating the oil delivery rate to between 0.5 and 20 gallons per hour, although other flow rates are within the scope of this liquid purifying device. The styles of metering orifice and oil filters used in this oil refining device are well known and in common use.

The distillation/evaporation chamber is located in-between the engine and filter for a number of reasons: (1) simplicity; (2) efficient use of space; (3) to maintain the oil at the proper temperature for contaminant evaporation; (4) minimization of oil piping and connections. In a preferred embodiment of the present invention, a three micron particulate filter is used for the filter media in order to optimize the filtration.

The specific apparatus for separating and removing the volatile contaminates from the oil is the distillation/evaporation chamber (22). The distillation/evaporation is simply a chamber of the proper shape and dimensions such as to promote the spreading of the oil into a thin film, and including an oil metering orifice (26), a vapor vent (20), and a purified oil exit (24). The distillation/evaporation chamber is enclosed by the distillation/evaporation lid (18), which is secured by the distillation/evaporation lid attachment means (38). In the preferred embodiment as observed in FIG. 1, the distillation/evaporation chamber (22), oil metering orifice (26), purified oil exit (24), and vapor vent (20) may all be incorporated into a single housing. The simplicity of this design is one of its greatest strengths.

Figure 4:
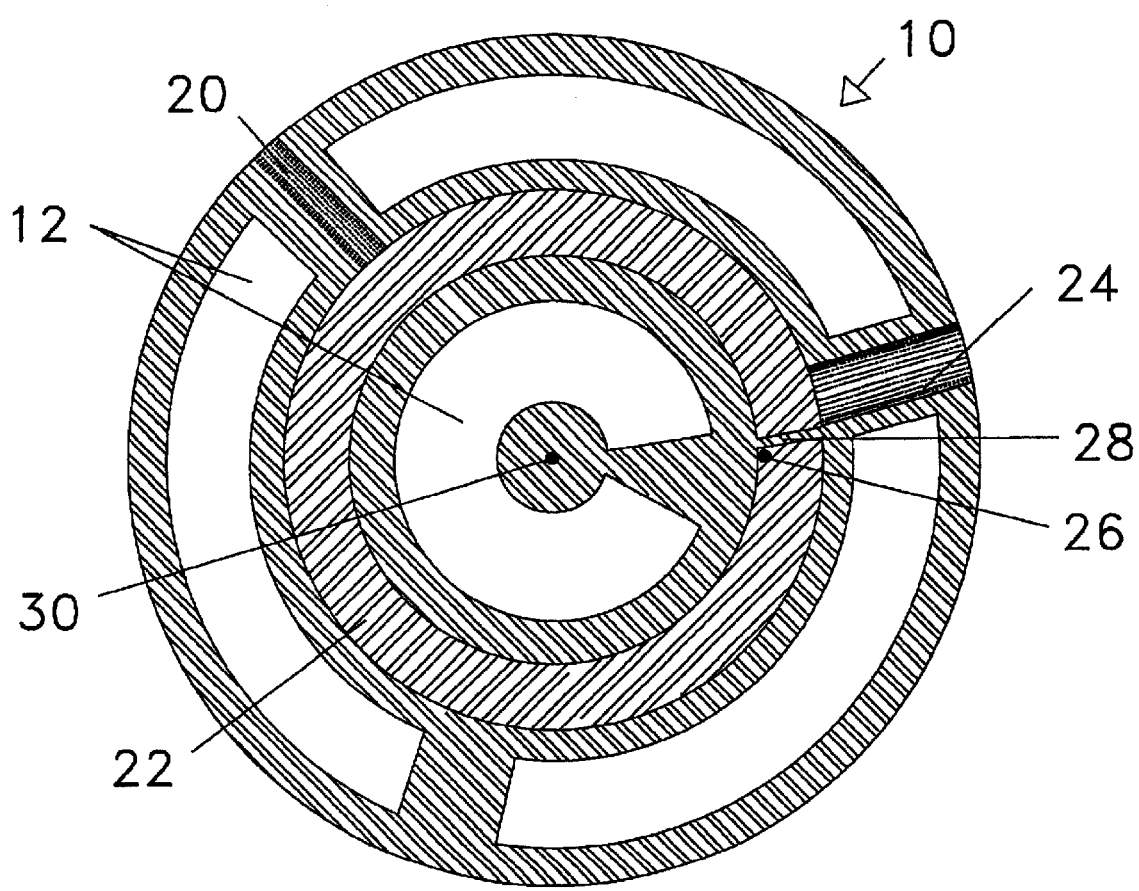
FIG. 4 is a horizontal sectional view of a first embodiment of the liquid purifying device, said view taken in the direction of arrows 1—1 in FIG 1.

As can be seen by the accompanying figures, the proper shape and dimensions of the distillation/evaporation chamber may vary widely according to the desired flow rate and liquid to be purified. FIG. 1 illustrates one such shape and dimensions wherein the shape of the distillation/evaporation chamber is an annular ring with a height roughly equivalent to twice the width of the chamber. Included in most embodiments of the liquid purifying device and specifically in FIG. 4, there can be seen a liquid diverting obstruction (28) which redirects the oil flow along the length of the distillation/evaporation chamber to the purified oil exit.

Referring again to FIG. 1, it can be seen that purified liquid exit (24) communicates the purified out from the distillation/evaporation chamber (22) to a location outside the chamber (which in the case of installation on an internal combustion engine, the oil would be communicated to an oil return line which returns the oil to the engine). Additionally, it can also be seen that vapor vent (20) communicates vaporized contaminates from within the distillation/evaporation chamber (22) to a location outside the chamber.

Operation

In the first preferred embodiment as illustrated by FIGS. 1–4, the oil to be processed passes unimpeded through the body of the liquid refining device to the filter through the liquid filter communication conduits (12), flows through liquid filter (32) in the customary manner, and most of the oil returns to the engine by way of the additional liquid filter communication conduit (12) located centrally to the filter.

Contaminated oil to be purified enters the distillation/evaporation chamber (22) at the liquid metering orifice (26). This contaminated oil is under pressure, and can come from the oil source (as shown in FIG. 20) or the conventional oil filter outlet. The oil, upon entering the distillation/evaporation chamber (22) experiences a sudden pressure drops considerably (to ambient or atmospheric pressure), due of course, to the metering orifice. The sudden drop of pressure facilitates evaporation of volatile contaminants that have been emulsified in the oil during its lubrication function. The oil, as it flows within the distillation/evaporation chamber (22) is controlled in its direction of flow by the liquid diverting obstruction (28) so as to maximize the length of travel of the oil within the distillation/evaporation chamber and thusly maximize the efficiency of volatile removal. Also, as the oil flows through the distillation/evaporation chamber (22), it flows in a thin-film, which effects the thin-film evaporation of the volatile contaminants from the oil. This thin-film evaporation process may be greatly enhanced by the heat contained within the oil itself as the engine reaches operating temperature.

Those skilled in the art will appreciate that the distillation/evaporation chamber need not be perfectly vertical while oil is being processed therethrough. This is because as the oil flows through the distillation/evaporation chamber, the natural vibrations inherent in most liquid sources, and in particular internal combustion engines, inputs physical forces into the flow of the oil resulting in a churning and lapping action of the oil within the distillation/evaporation chamber (22) which evenly coats the interior of the chamber with a thin film of oil, thereby causing increased efficiency in evaporation of the volatile contaminants from within the oil.

Once flowing, this oil flow will remain continuous and uninterrupted throughout the distillation/evaporation chamber, whereupon the oil exits the distillation/evaporation chamber by way of purified liquid exit (24) to be returned to the engine. As can be appreciated, as these various volatile contaminants vaporize and are distilled from the initially contaminated oil, the accumulation of vapor requires a means of exhaust. Because of the fact that the distillation/evaporation chamber forms essentially a closed system, the pressure within the closed system, and therefore within the liquid channel (22) remains essentially constant. Therefore, as the various contaminants vaporize and expand, the vapor is forced through the vapor vent (20). In addition, in certain mobile and industrial applications, a negative pressure (a separate vacuum) can be used to withdraw the released vaporized contaminants from the evaporation chamber.

First Alternative Embodiment

FIGS. 5–8 illustrates a first alternative embodiment of the liquid purifying device.

Figure 5:
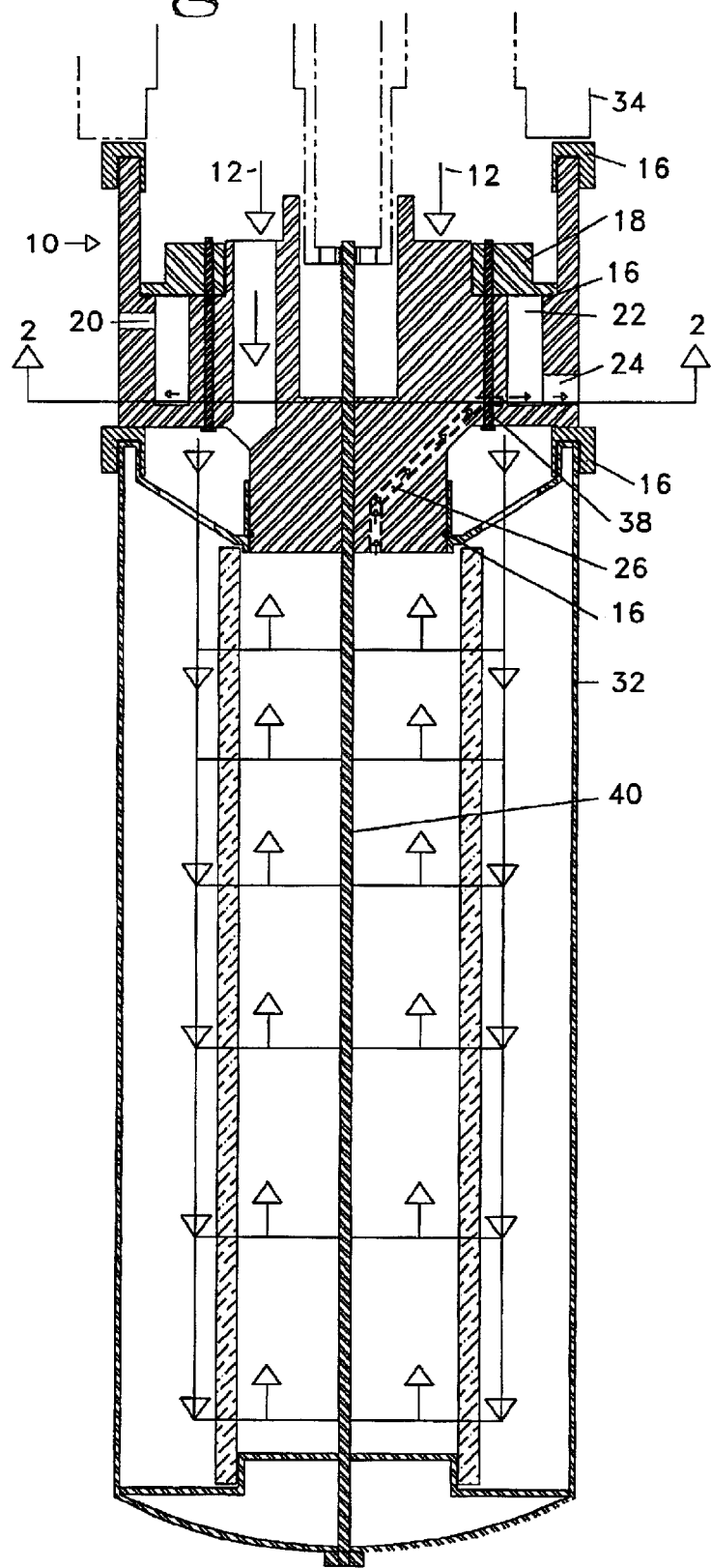
FIG. 5 is a vertical sectional view of a first alternative design of the liquid purifying device.
Figure 6:
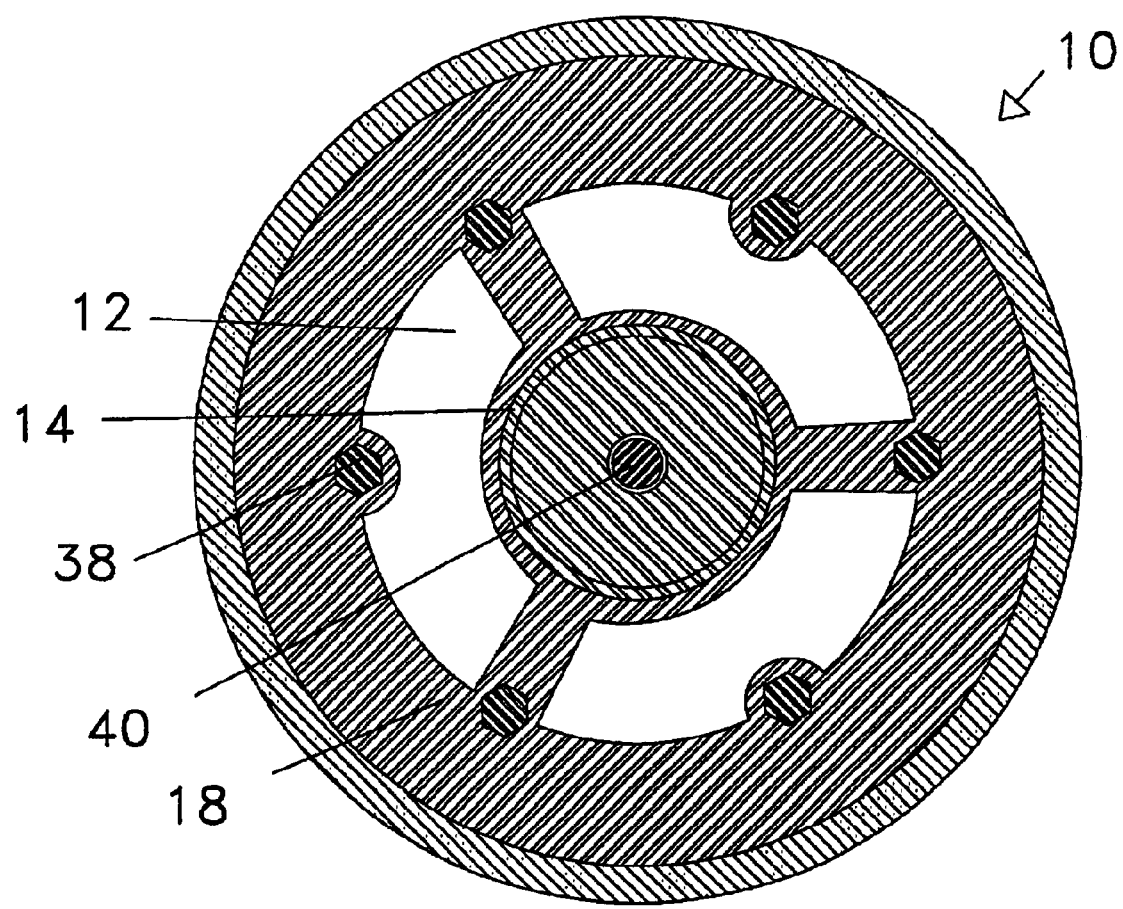
FIG. 6 is a top plan view of a first alternative design of the liquid purifying device.
Figure 7:
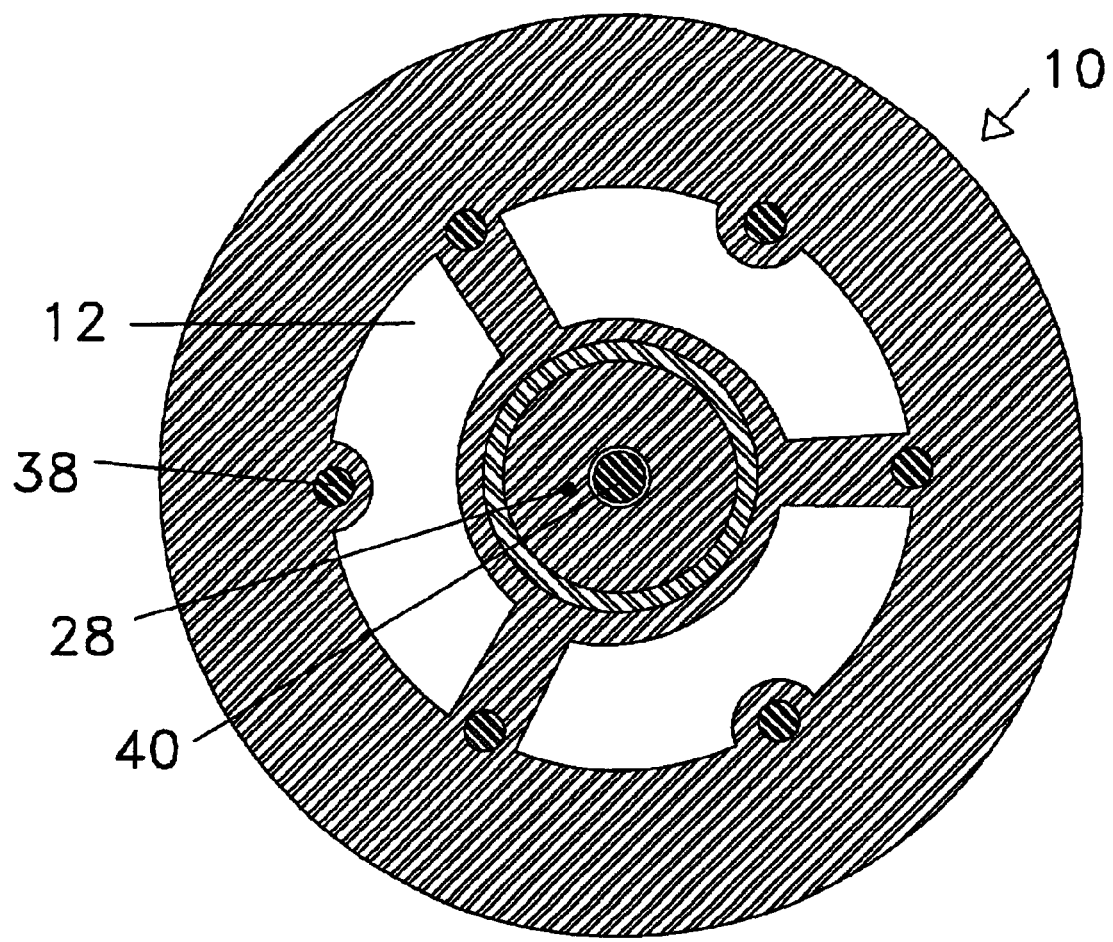
FIG. 7 is a bottom plan view of a first alternative design of the liquid purifying device.
Figure 8:
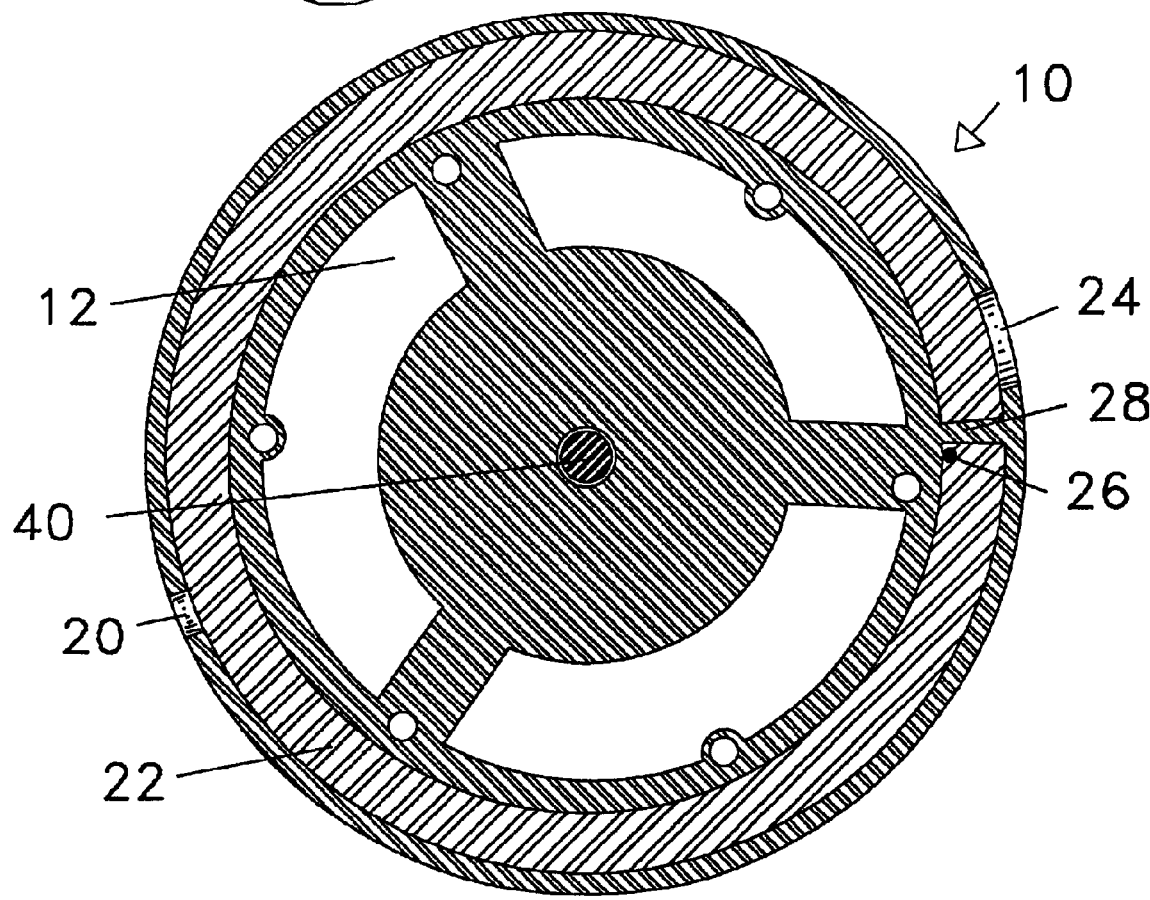
FIG. 8 is a horizontal sectional view of a first alternative design of the liquid purifying device, said view taken in the direction of arrows 2—2 in FIG. 5.

The first alternative embodiment of FIG. 5 illustrates the use of an alternate means of attachment of both the liquid purifying device to the source (engine) and of the filter to the device by the use of an attachment means (40) which extents completely through the filter housing through the liquid purifying device to the liquid source. Additionally, the full flow of the oil to be purified is directed through the liquid purifying device so that all oil is purified before being returned to use.

Second Alternative Embodiment

Figure 9:
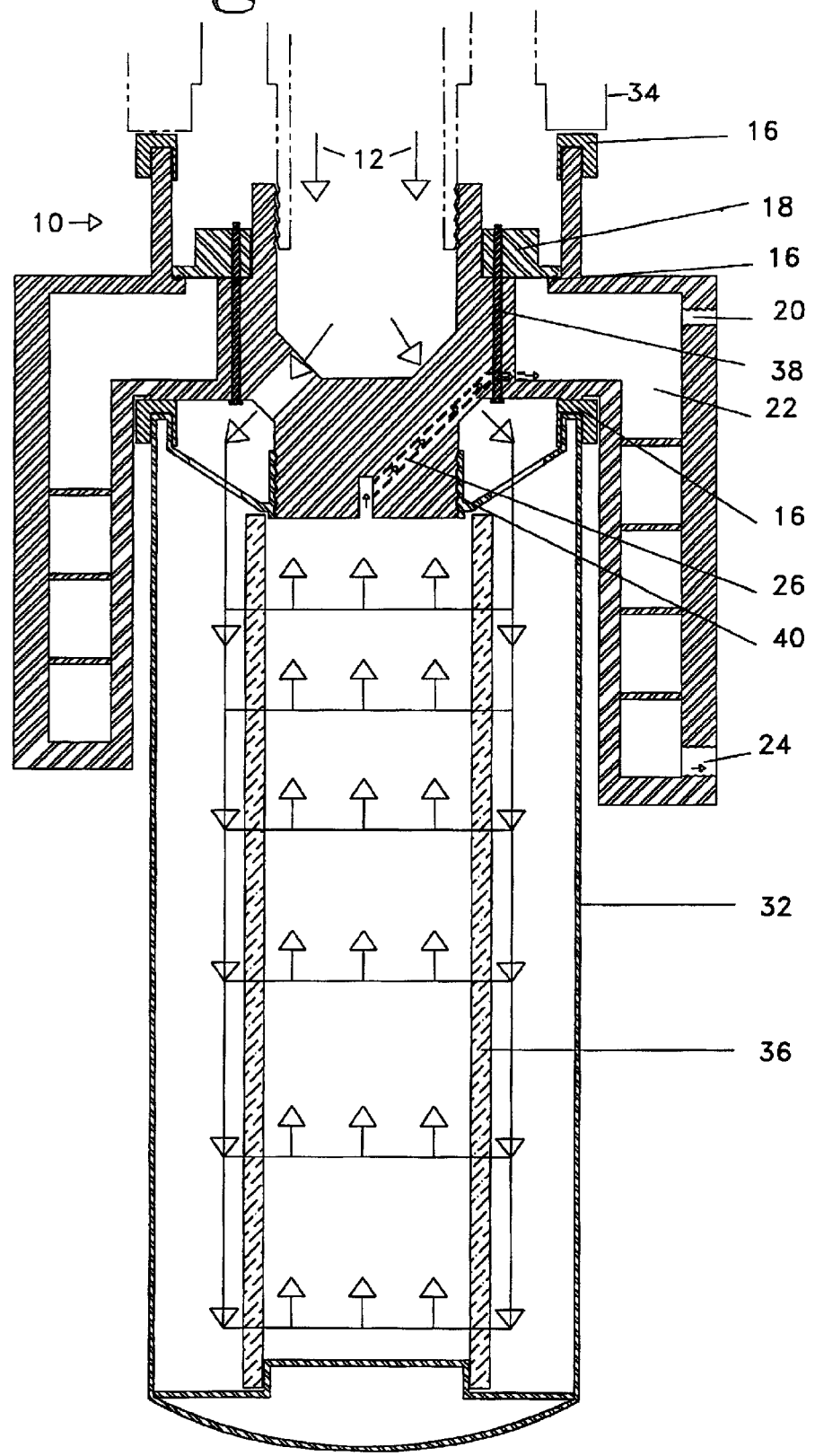
FIG. 9 is a vertical sectional view of a second alternative design of the liquid purifying device.

The second alternative embodiment of FIG. 9 illustrates the use of an extended distillation/evaporation chamber, which extension extends longitudinally to the filter and surrounds the filter. Within this extension is a spirally extending distillation/evaporation chamber which effects a longer evaporation path for increased volatile removal efficiency. Additionally, the full flow of the oil to be purified is directed through the liquid purifying device so that all oil is purified before being returned to use.

Third Alternative Embodiment

Figure 10:
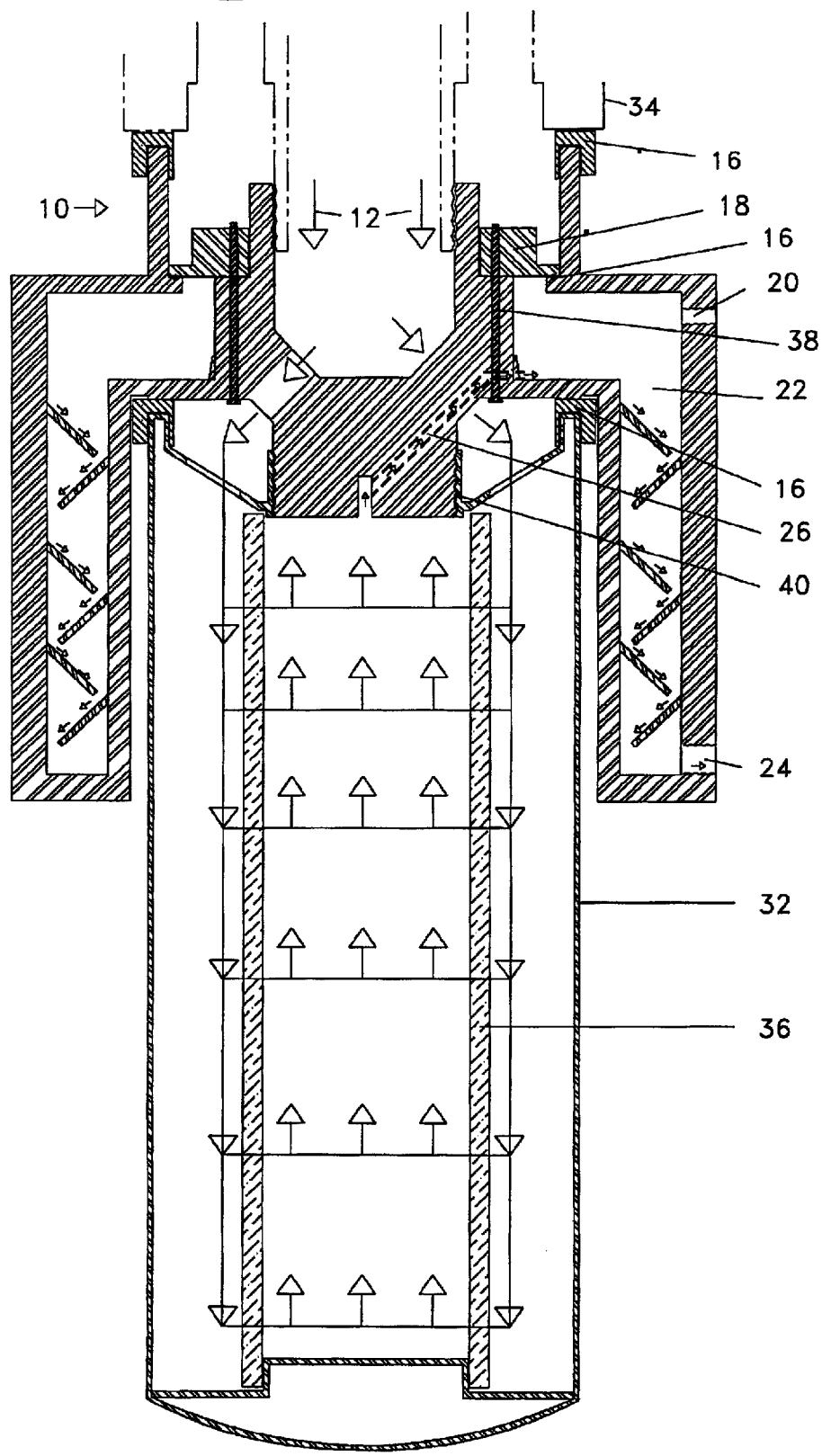
FIG. 10 is a vertical sectional view of a third alternative design of the liquid purifying device.

The third alternative embodiment of FIG. 10 illustrates the use of an extended distillation/evaporation chamber, which extension extends longitudinally to the filter and surrounds the filter. Within this extension is a cascading and downwardly projecting array of fins which effects a longer evaporation path for increased volatile removal efficiency. Additionally, the full flow of the oil to be purified is directed through the liquid purifying device so that all oil is purified before being returned to use.

Forth Alternative Embodiment

Figure 11:
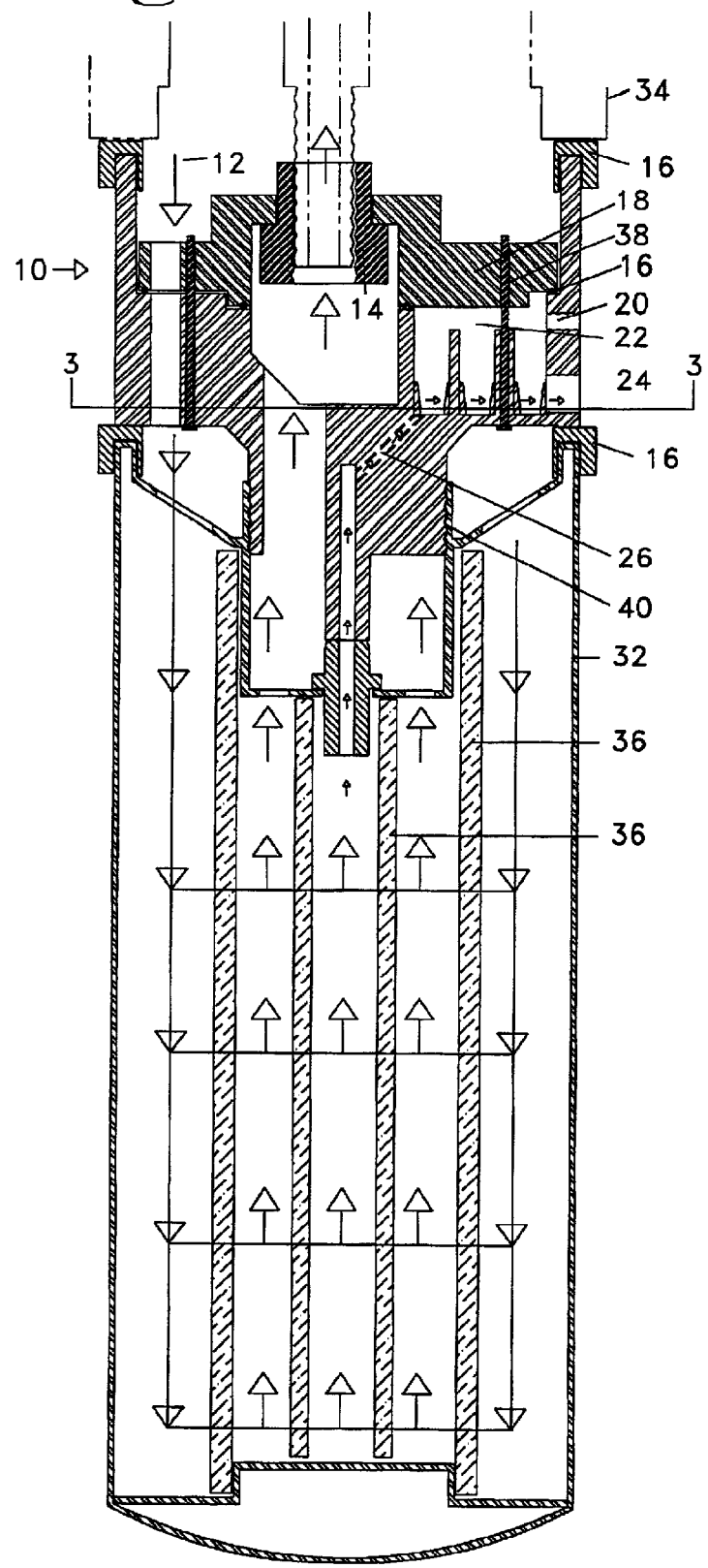
FIG. 11 is a vertical sectional view of a fourth alternative design of the liquid purifying device.
Figure 12:
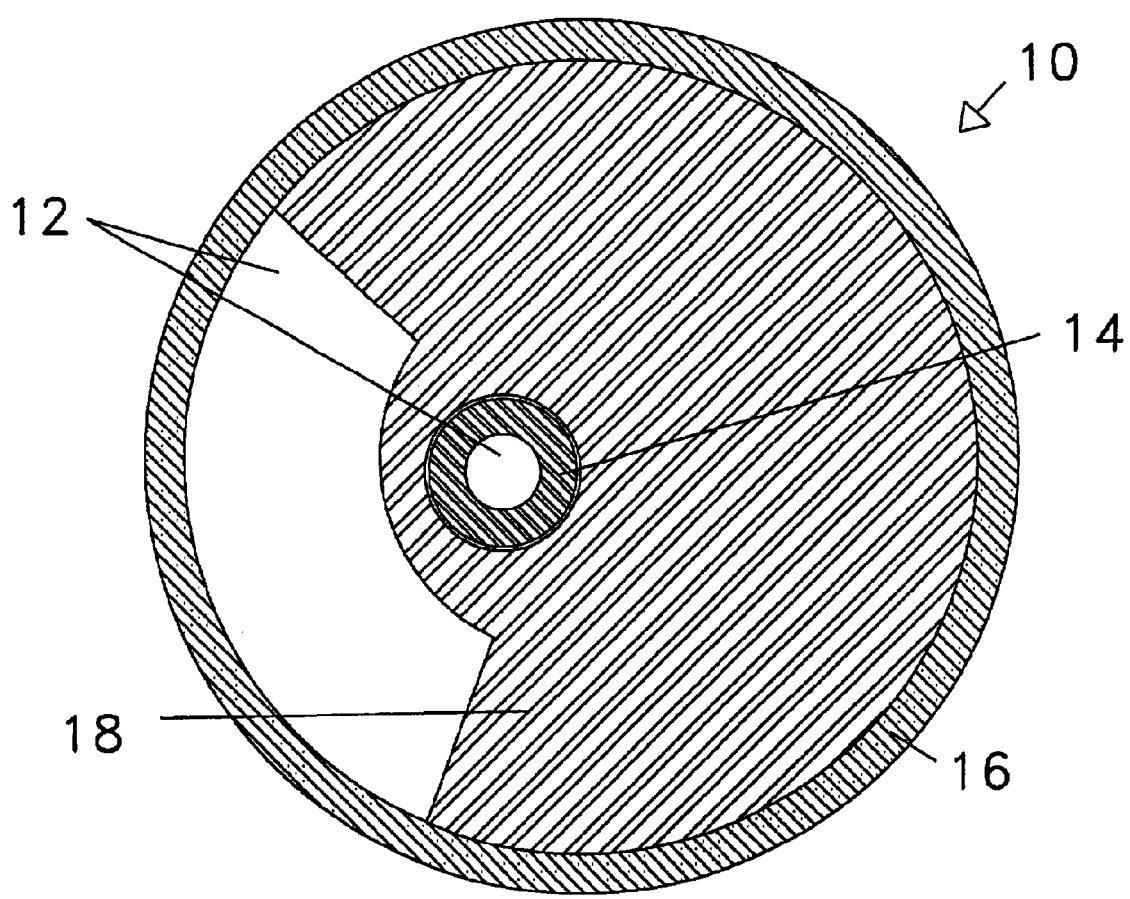
FIG. 12 is a top plan view of a forth embodiment of the liquid purifying device.
Figure 13:
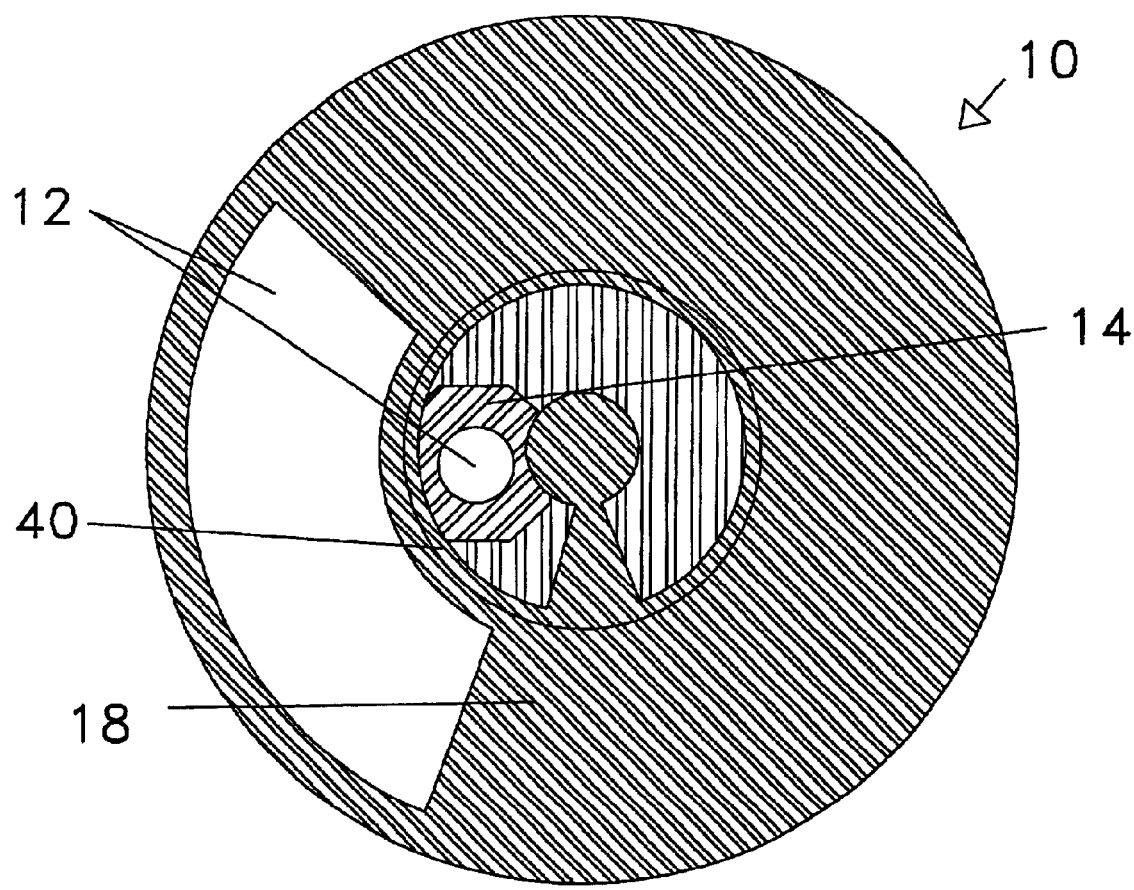
FIG. 13 is a bottom plan view of a forth embodiment of the liquid purifying device.
Figure 14:
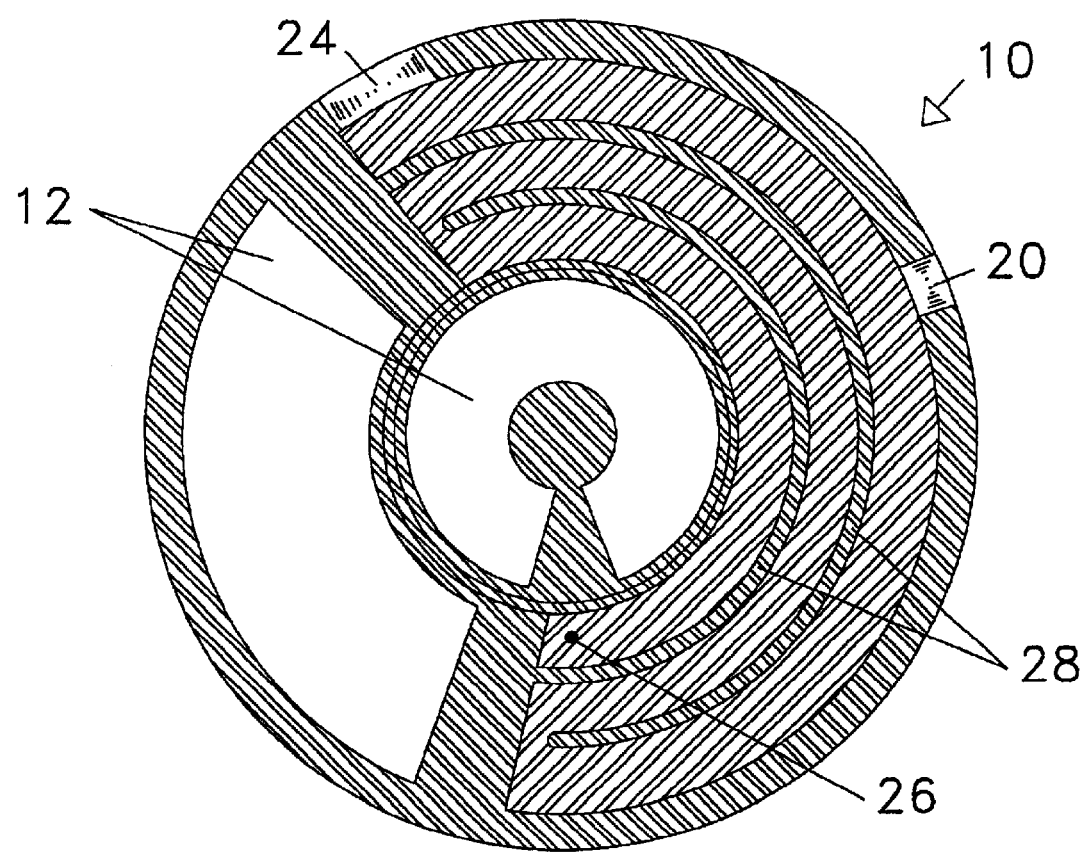
FIG. 14 is a horizontal sectional view of a forth embodiment of the liquid purifying device, said view taken in the direction of arrows 3—3 in FIG. 11.

FIGS. 11–14 illustrates a second alternative embodiment of the liquid purifying device. The forth alternative embodiment of FIG. 11 illustrates the use of a liquid purifying device to source attachment means (14) which comprises a bolt which itself comprises a liquid flow conduit (14) for allowing the device to be offset-mounted. This means of mounting allows the device to be installed in otherwise space restricted areas. Additionally, the distillation/ evaporation chamber is constructed in a non-annular fashion, but instead is grouped to one general location within the liquid purifying device, while the liquid conduits are themselves also grouped within the liquid purifying device as shown.

Fifth Alternative Embodiment

Figure 15:
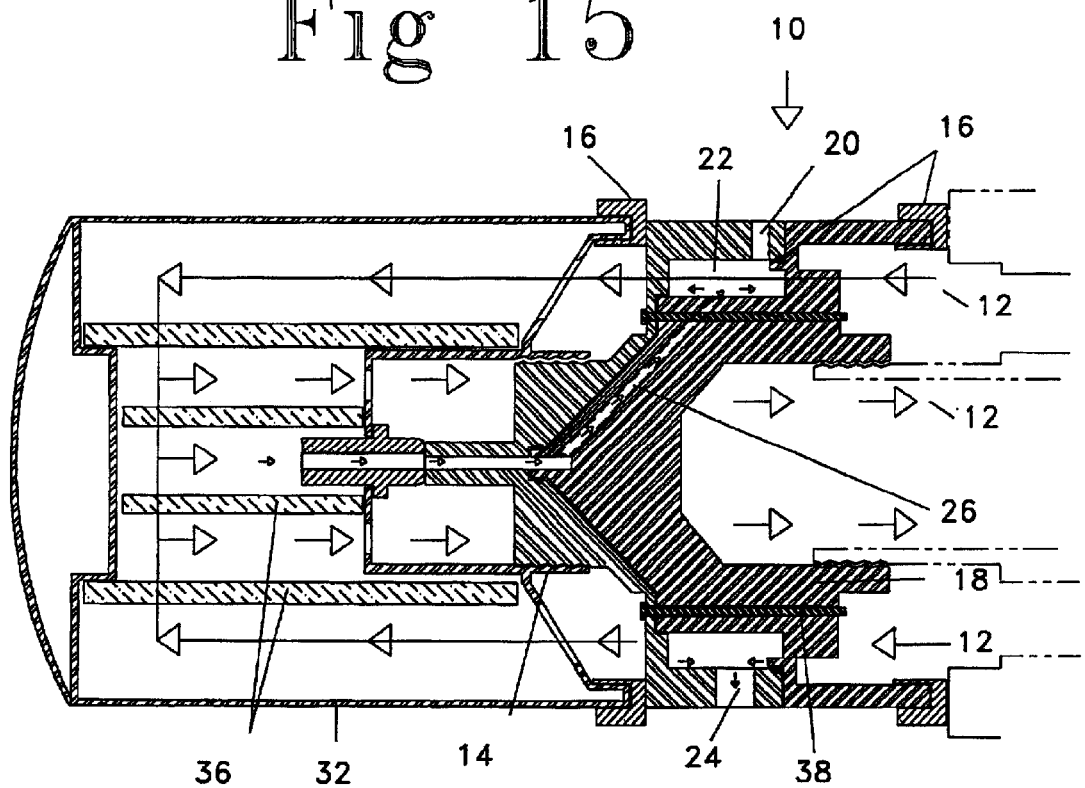
FIG. 15 is a vertical sectional view of a fifth alternative design of the liquid purifying device.

The fifth alternative embodiment of FIG. 15 illustrates the use of a horizontally mounted liquid purifying device which incorporates the liquid metering orifice (26) and the vapor vent (20) in the uppermost location, while the purified liquid exit (24) is located in the lowermost location. No liquid diverting obstruction (28) is used with this embodiment so as to allow the oil to flow evenly and uniformly down all interior surfaces of this horizontally mounted embodiment.

Sixth Alternative Embodiment

Figure 16:
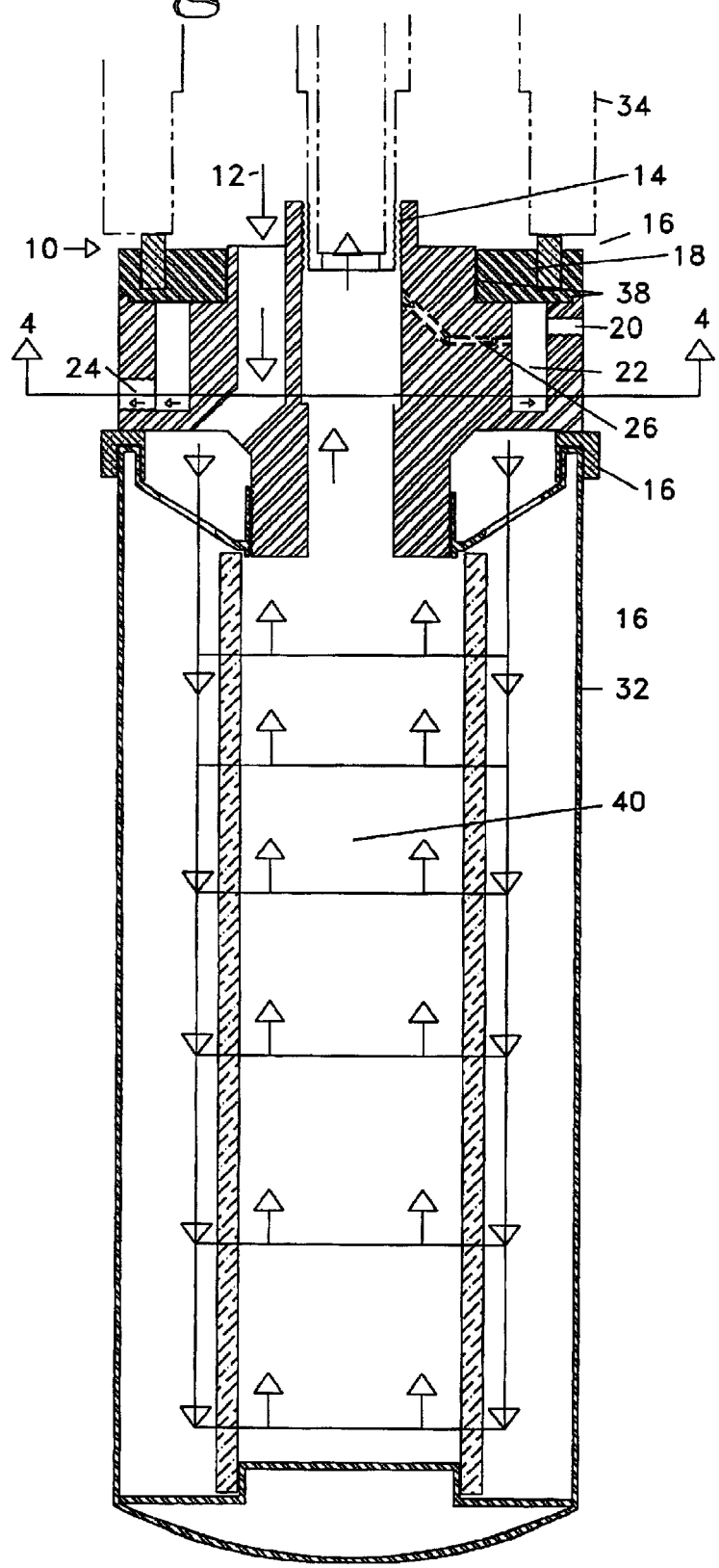
FIG. 16 is a vertical sectional view of a sixth alternative design of the liquid purifying device.
Figure 17:
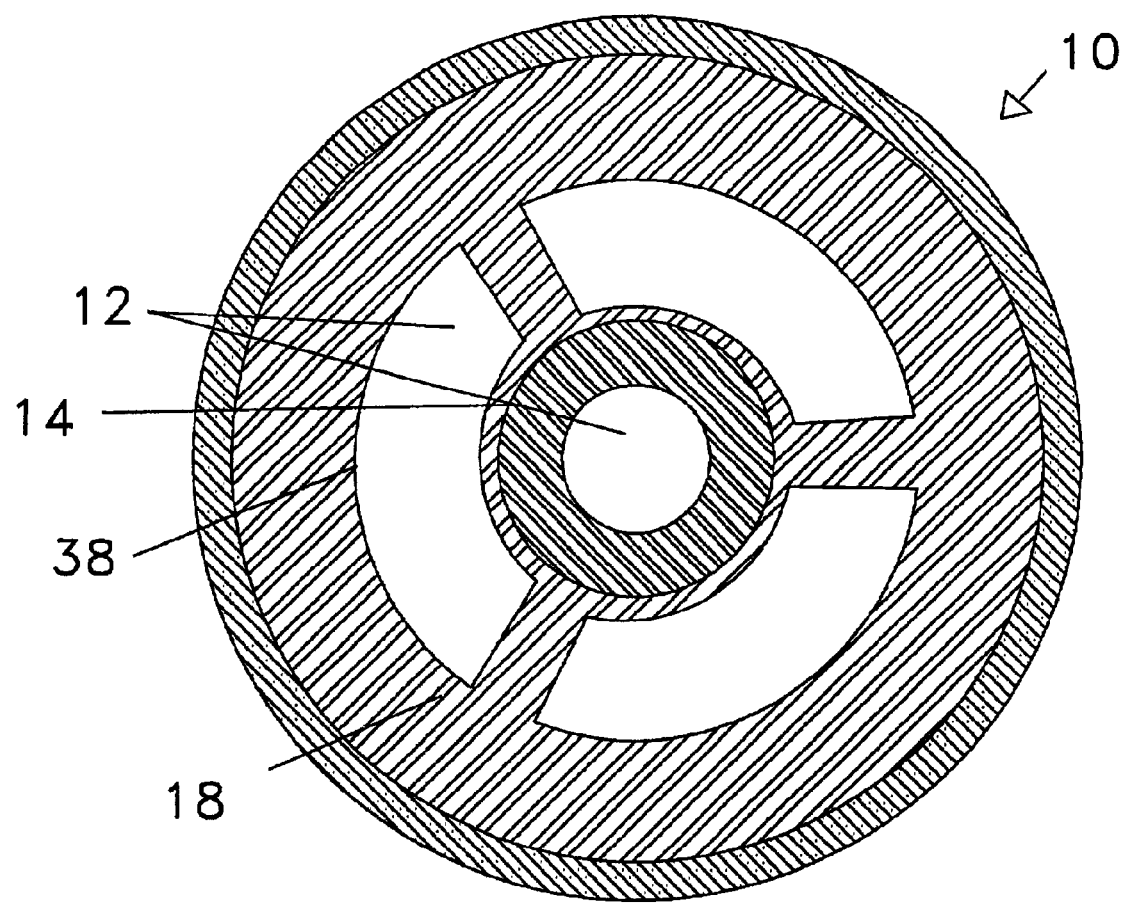
FIG. 17 is a top plan view of a sixth embodiment of the liquid purifying device.

FIGS. 16–19 illustrates a second alternative embodiment of the liquid purifying device. The sixth alternative embodiment of FIG. 16 illustrates the use of distillation/evaporation lid (18) which is engaged as part of the liquid purifying device by means of a press fit, thereby eliminating the need for additional lid attachment means. Additionally, the distillation/evaporation chamber is constructed so as to facilitate installation by incorporating a plurality of vapor vents (20) and purified liquid exits (24). This allows the user to install the device without concern whether the vapor vent or liquid exit will be located in the proper orientation. The user ability to install the device and then select the appropriate vapor vent and liquid exit locations for proper operation will greatly enhance the installation procedure.

Seventh Alternative Embodiment

The seventh alternative embodiment of FIG. 20 illustrates the construction of a liquid refining device which does not use a filter.

This liquid purifying device is clearly new and useful. Moreover, it was not obvious to those of ordinary skill in the art at the time it was made, in view of the prior art considered as a whole as required by law.

It will thus be seen that the objects set forth above, and those made apparent from the foregoing description, are efficiently attained and since certain changes may be made in the above construction without departing from the scope of this liquid purifying device, it is intended that all matters contained in the foregoing construction or shown in the accompanying drawings shall be interpreted as illustrative and not in a limiting sense.

It is also to be understood that the following claims are intended to cover all of the generic and specific features of this liquid purifying device herein described, and all statements of the scope of this liquid purifying device which, as a matter of language, might be said to fall therebetween.

I claim:

1. An apparatus for connecting a liquid filter to a liquid source and for separating volatile contaminants from the liquid, comprising:

a cylindrical block including a first end and a second end and a radially outer peripheral surface;

a central outlet bore extending from the first end to the second end of the block;

an inlet passage radially spaced apart and isolated from the central bore and extending from the first end to the second end of the block;

an annular evaporation channel formed into the first end of block and located radially outwardly from the inlet passage and having a base surface spaced from the second end of the block;

a cover on the first end of the block for closing the evaporation channel;

a purified liquid outlet channel adjacent the base of the annular channel and extending the outer peripheral surface of the block;

a metering orifice isolated from the inlet passage and extending from the central bore to a portion of the annular channel that is spaced above the purified liquid outlet channel such that a thin film of oil is formed on a surface of the evaporation channel;

a vapor vent channel extending from part of the annular channel that is positioned above the purified liquid outlet channel and extending to an outer peripheral surface of the bock;

whereby the first end of the block is attached to the liquid source such that a contaminated liquid is directed into the inlet passage and purified liquid is returned to the source via the central outlet bore, whereby the second end of the block is attached to an end of the liquid filter such that contaminated liquid is directed into the filter and partially purified liquid is directed from the filter into the central outlet bore, whereby partially purified liquid from the central outlet bore is directed into the annular evaporation chamber via the metering orifice, whereby volatile contaminants are separated from the partially purified oil in the evaporation chamber, and whereby purified oil exits the evaporation chamber via the purified liquid outlet and volatile contaminants exit the evaporation chamber via the vapor vent channel.

* * * * *